Patented June 14, 1938

2,120,660

UNITED STATES PATENT OFFICE 2,120,660

MANUFACTURE OF DI-J ACID

Walter Valentine Wirth, Woodstown, N. J., assignor to E. I. du Pont de Nemours & Company, Wilmington, Del., a corporation of Delaware No Drawing. Application July 1, 1937, Serial No. 151,449

8 Claims. (Cl. 260—129)

This invention relates to the manufacture of Di-J Acid, which is the technical name for 5,5'-dihydroxy - 2,2' - dinaphthylamine - 7, 7' - disulfonic acid and its water-soluble salts.

It is an object of this invention to provide an improved process for manufacturing the aforenamed intermediate, whereby to obtain the same in good yield and high state of purity. Other and further important objects of this invention will appear as the description proceeds.

Di-J Acid is an intermediate for azo dyestuffs. Although the word Acid constitutes part of its technical name, it is generally produced in commerce as the disodium salt, and the name Di-J Acid is used as a generic term for both the free acid and its water-soluble salts. This name will be used in this specification in the same generic sense; and where the di-sodium salt is to be specified, the name Di-J-Acid-sodium-salt will be employed.

The commercial preparation of Di-J Acid is described in U. S. Patent No. 649,714 (1900). According to this patent, the sodium salt of J-acid (2-amino-5-naphthol-7-sulfonic acid) is heated at 80 to 100° C. in strong sodium-bisulfite solution, until a test shows no unreacted J-acid. The reaction mass is then cooled and the Di-J Acid formed is filtered off. It is dissolved in water, precipitated with an excess of hydrochloric acid, and filtered as the finished product.

This process, however, does not give very satisfactory results on a commercial scale. My attempts to prepare Di-J Acid by this method resulted in obtaining an inferior product in yields no higher than 60% of theory. The main trouble seems to be the tendency to form the sodium sulfite ester of dioxy-J-acid,

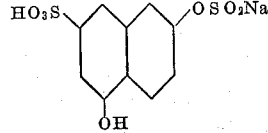

as a by-product in large quantities. Another difficulty with the above method is the long time required for complete reaction (as high as 24 hours).

Now I have found that the above process of producing Di-J Acid can be considerably accelerated, and the yield and purity both can be considerably advanced, by conducting the reaction in the presence of a water-soluble, acid reacting ammonium salt, for instance ammonium chloride or ammonium bisulfite.

The role of the ammonium salt in this reaction is not quite clear to me, but it does have the effect of depressing the formation of dioxy-J-acid-sulfite-ester as by-product. Without limiting my invention to any particular theory, I venture to suggest that the reaction proceeds in two stages, forming first the dioxy-J-acid-sulfite-ester which then reacts with another molecule of J-acid to produce Di-J Acid. The effect of the ammonium salt, then, is to depress the rate of formation of the intermediate ester thereby enabling the second reaction to catch up with it, thus preventing an accumulation of the ester.

Without limiting my invention to any particular procedure, the following example, in which parts by weight are given will serve to illustrate my preferred mode of operation.

239 parts of J-acid (1 mol.) are charged into 900 parts of water, and 53.5 parts (1 mol.) of ammonium chloride plus 260 parts (2.5 mols) of sodium bisulfite are added. The mass is heated at a gentle reflux (100 to 102° C.) for 6 hours. 250 parts of sodium chloride are then added; the mass is cooled and filtered, and the filter cake is washed with brine solution. 190 parts of Di-J Acid-di-sodium salt, of good quality are thus obtained.

In lieu of sodium bisulfite in the above example 2 to 3 mols of ammonium bisulfite may be employed. In this case no ammonium chloride need be added, and the yield is as good as in the above example.

It will be observed that in my preferred process I isolate the reaction product directly, in the form of its disodium or diammonium salt. This is an advantage over the old process, which generally required purification of the product by dissolving it in water and precipitating with an excess of acid. Also, in my process the reaction was complete in 6 hours as against 24 hours generally required in the art, and my yield was much higher and was much more consistent in repeated runs, than in the art. Finally, the product obtained by my process is of a high grade of purity and may be used directly in the manufacture of azo dyestuffs.

It will be understood, that the details of my process may be varied within wide limits, without departing from the spirit of this invention. Thus, in lieu of 2.5 mols of NaHSO₃, any quantity above 1.5 mols, preferably between 2 and 3 mols, per mole of J-acid may be employed.

Likewise, the strength of the sodium bisulfite solution employed may vary within wide limits. A concentration of 20 to 30% seems to give the best results from the viewpoint of stirring the reaction mass.

The quantity of ammonium chloride may deviate considerably from 1 mol. per mol. of J-acid. Even as low as 0.5 mol. of the former will produce some improvement. On the other hand, there is no point in going beyond 1.5 mols per mole of J-acid, since the improvement in yield and purity does not increase much further as higher ratios are used.

I claim:

1. In the process of producing Di-J Acid by reacting J-acid with sodium bisulfite, the improvement which comprises conducting the reaction in the presence of a water-soluble, acid-reacting ammonium salt.

2. In the process of producing Di-J Acid by reacting J-acid with sodium bisulfite, the improvement which comprises conducting the reaction in the presence of ammonium chloride.

3. The process which comprises heating together in aqueous medium 2-amino-5-naphthol-7-sulfonic acid, sodium bisulfite and a water-soluble, acid-reacting ammonium salt, and recovering the Di-J Acid thus produced.

4. The process which comprises heating together in aqueous solution about 1 mol. of 2-amino-5-naphthol-7-sulfonic acid, about 2 to about 3 mols of sodium bisulfite, and from 0.5 to 1.5 mols of ammonium chloride, and recovering the disodium salt of 5,5'-dihydroxy-2,2'-dinaphthylamine-7,7'-disulfonic acid thus obtained.

5. A process as in claim 4, the heating being done at about the reflux temperature of the mixture.

6. The process which comprises heating together in aqueous medium about 1 mol. of 2-amino-5-naphthol-7-sulfonic acid, about 2.5 mols of sodium bisulfite, and about 1 mol. of ammonium chloride, maintaining the mass at gentle reflux until the reaction is substantially complete, and recovering the disodium salt of 5,5'-dihydroxy-2,2'-dinaphthylamine-7,7'-disulfonic acid thus obtained.

7. The process of producing Di-J Acid, which comprises heating J-acid in the presence of ammonium bisulfite, and recovering the reaction product.

8. The process of producing Di-J Acid, which comprises heating in aqueous medium about 1 mole of 2-amino-5-naphthol-7-sulfonic acid and about 2 to about 3 mols of ammonium bisulfite, maintaining the mass at gentle reflux until the reaction is substantially complete, and recovering the reaction product.

WALTER VALENTINE WIRTH.